United States Patent [19]
Johnson

[11] Patent Number: 5,956,118
[45] Date of Patent: Sep. 21, 1999

[54] EYEGLASSES WITH FLEXIBLE ATTACHMENT LACE

[76] Inventor: Kevin B. Johnson, 321 Sequoia Rd., Boulder Creek, Calif. 95006

[21] Appl. No.: 09/065,206

[22] Filed: Apr. 23, 1998

[51] Int. Cl.⁶ ........................................................ G02C 3/00
[52] U.S. Cl. ................................................................ 351/156
[58] Field of Search .................................. 351/156, 157, 351/158; 2/452; 24/3.1, 3.3

[56] References Cited

U.S. PATENT DOCUMENTS 5,541,676  7/1996  Pallat ...................................... 351/156

FOREIGN PATENT DOCUMENTS 2224-120  10/1974  France ........................................ 2/452

*Primary Examiner*—Huy Mai

[57] ABSTRACT

A new eyeglasses with flexible attachment lace for securely holding eyeglasses to the face of a wearer. The inventive device includes a front frame and a flexible elongate lace. The front frame has a pair of opposite sides. Each side of the front frame has a loophole outwardly extending therefrom. The lace has a pair of opposite ends. One of the ends of the lace is looped through one of the loopholes of the front frame while the other end of the lace is looped through the other loophole of the front frame.

7 Claims, 4 Drawing Sheets

EYEGLASSES WITH FLEXIBLE ATTACHMENT LACE

BACKGROUND OF THE INVENTION

1. Field of the Invention

The present invention relates to eyeglass holding devices and more particularly pertains to a new eyeglasses with flexible attachment lace for securely holding eyeglasses to the face of a wearer.

2. Description of the Prior Art

The use of eyeglass holding devices is known in the prior art. More specifically, eyeglass holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art eyeglass holding devices include U.S. Pat. No. 5,309,577; U.S. Pat. No. 4,986,650; PCT Pat. No. WO 87/01920 (inventor: Murrell); U.S. Pat. No. 3,397,026; PCT Patent No. WO 90/09609 (inventor: Murrell); U.S. Pat. No. 5,367,347; and U.S. Pat. No. 2,626,538.

While these devices fulfill their respective, particular objectives and requirements, the aforementioned patents do not disclose a new eyeglasses with flexible attachment lace. The inventive device includes a front frame and a flexible elongate lace. The front frame has a pair of opposite sides. Each side of the front frame has a loophole outwardly extending therefrom. The lace has a pair of opposite ends. One of the ends of the lace is looped through one of the loopholes of the front frame while the other end of the lace is looped through the other loophole of the front frame.

In these respects, the eyeglasses with flexible attachment lace according to the present invention substantially departs from the conventional concepts and designs of the prior art, and in so doing provides an apparatus primarily developed for the purpose of securely holding eyeglasses to the face of a user.

SUMMARY OF THE INVENTION

In view of the foregoing disadvantages inherent in the known types of eyeglass holding devices now present in the prior art, the present invention provides a new eyeglasses with flexible attachment lace construction wherein the same can be utilized for securely holding eyeglasses to the face of a user.

The general purpose of the present invention, which will be described subsequently in greater detail, is to provide a new eyeglasses with flexible attachment lace apparatus and method which has many of the advantages of the eyeglass holding devices mentioned heretofore and many novel features that result in a new eyeglasses with flexible attachment lace which is not anticipated, rendered obvious, suggested, or even implied by any of the prior art eyeglass holding devices, either alone or in any combination thereof.

To attain this, the present invention generally comprises a front frame and a flexible elongate lace. The front frame has a pair of opposite sides. Each side of the front frame has a loophole outwardly extending therefrom. The lace has a pair of opposite ends. One of the ends of the lace is looped through one of the loopholes of the front frame while the other end of the lace is looped through the other loophole of the front frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new eyeglasses with flexible attachment lace apparatus and method which has many of the advantages of the eyeglass holding devices mentioned heretofore and many novel features that result in a new eyeglasses with flexible attachment lace which is not anticipated, rendered obvious, suggested, or even implied by any of the prior art eyeglass holding devices, either alone or in any combination thereof.

It is another object of the present invention to provide a new eyeglasses with flexible attachment lace which may be easily and efficiently manufactured and marketed.

It is a further object of the present invention to provide a new eyeglasses with flexible attachment lace which is of a durable and reliable construction.

An even further object of the present invention is to provide a new eyeglasses with flexible attachment lace which is susceptible of a low cost of manufacture with regard to both materials and labor, and which accordingly is then susceptible of low prices of sale to the consuming public, thereby making such eyeglasses with flexible attachment lace economically available to the buying public.

Still yet another object of the present invention is to provide a new eyeglasses with flexible attachment lace which provides in the apparatuses and methods of the prior art some of the advantages thereof, while simultaneously overcoming some of the disadvantages normally associated therewith.

Still another object of the present invention is to provide a new eyeglasses with flexible attachment lace for securely holding eyeglasses to the face of a wearer.

Yet another object of the present invention is to provide a new eyeglasses with flexible attachment lace which includes a front frame and a flexible elongate lace. The front frame has a pair of opposite sides. Each side of the front frame has a loophole outwardly extending therefrom. The lace has a pair of opposite ends. One of the ends of the lace is looped through one of the loopholes of the front frame while the other end of the lace is looped through the other loophole of the front frame.

Still yet another object of the present invention is to provide a new eyeglasses with flexible attachment lace that holds eyeglasses securely on the nose of a user to reduce slippage of the eyeglasses off of the face of the wearer.

Even still another object of the present invention is to provide a new eyeglasses with flexible attachment lace that reduces the risk of breaking glasses due to their falling off of a wearer's face.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
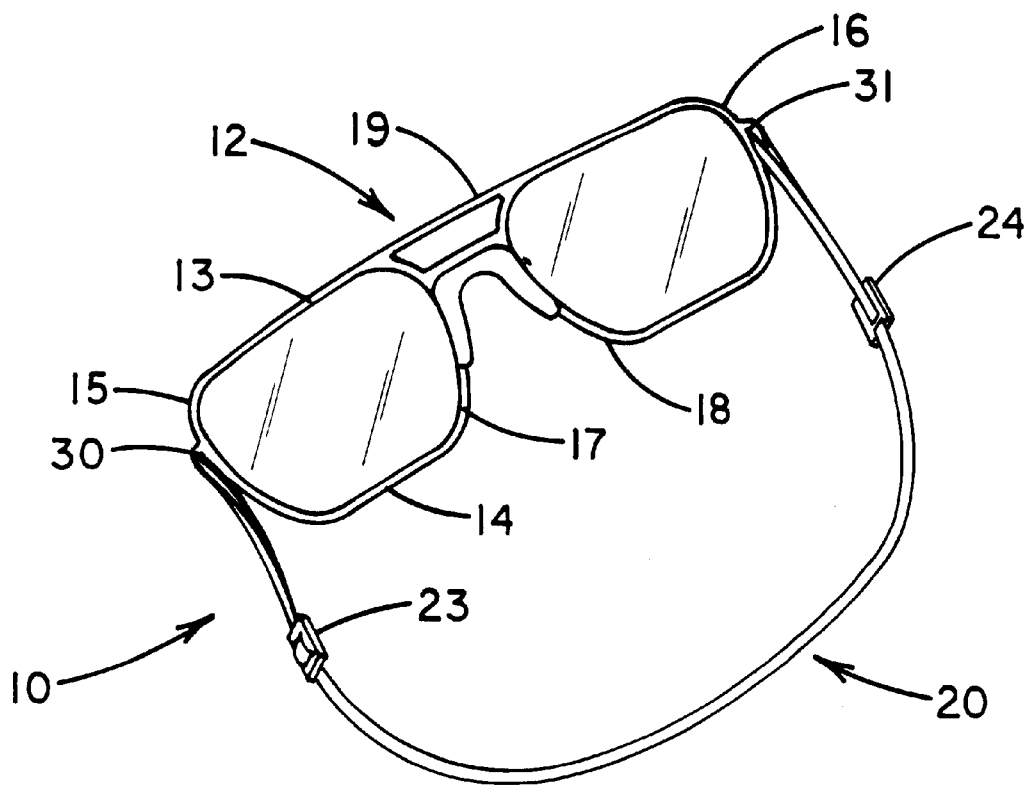
FIG. 1 is a schematic perspective view of a new eyeglasses with flexible attachment lace according to the present invention.
Figure 2:
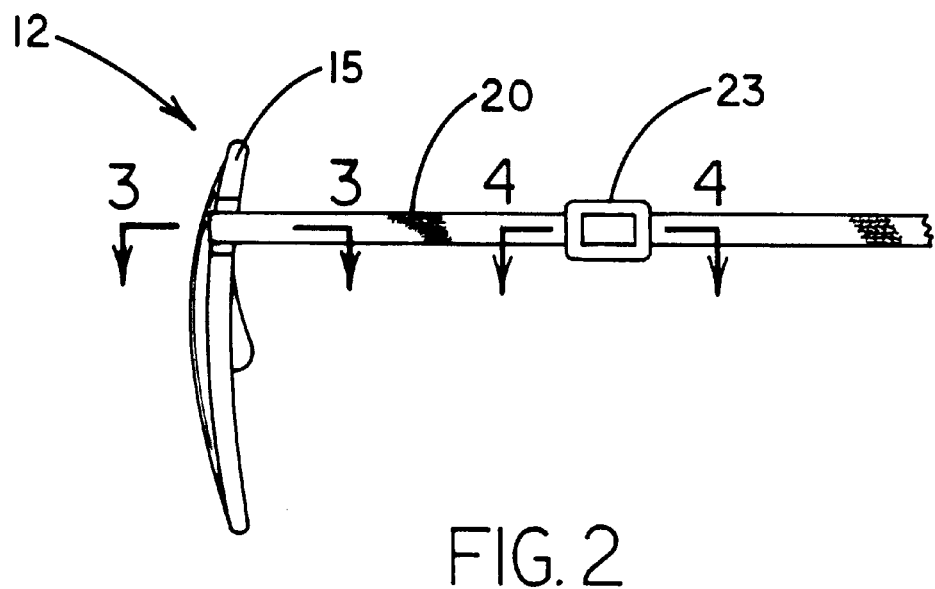
FIG. 2 is a schematic side view of the present invention.
Figure 3:
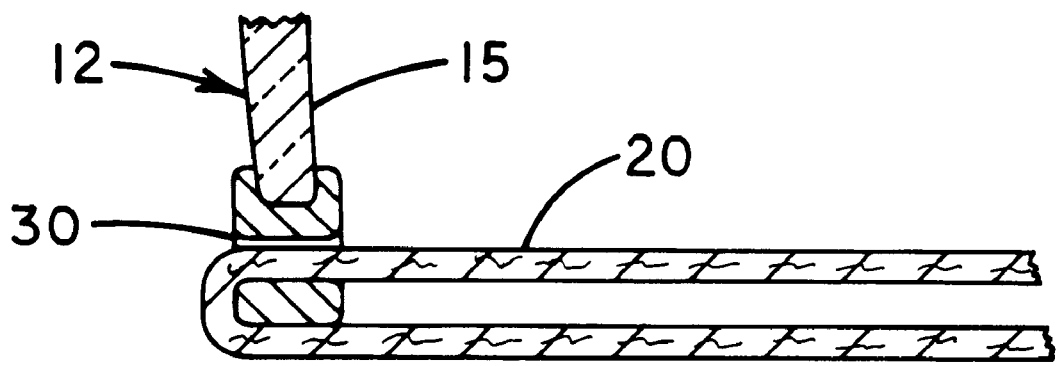
FIG. 3 is a schematic sectional view of a loophole of the present invention taken from line 3—3 of FIG. 2.
Figure 4:
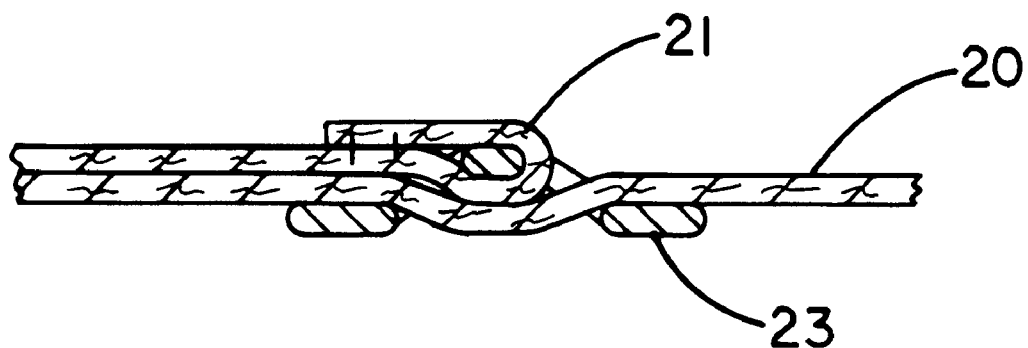
FIG. 4 is a schematic sectional view of an adjustment buckle of the present invention taken from line 3—3 of FIG. 2.

With reference now to the drawings, and in particular to FIGS. 1 through 8 thereof, a new eyeglasses with flexible attachment lace embodying the principles and concepts of the present invention and generally designated by the reference numeral 10 will be described.

As best illustrated in FIGS. 1 through 8, the eyeglasses with flexible attachment lace 10 generally comprises a front frame 12 and a flexible elongate lace 20. The front frame 12 has a pair of opposite sides 15,16. Each side 15,16 of the front frame 12 has a loophole 30,31 outwardly extending therefrom. The lace 20 has a pair of opposite ends 21,22. One of the ends 21,22 of the lace 20 is looped through one of the loopholes 30 of the front frame 12 while the other end 22 of the lace 20 is looped through the other loophole 31 of the front frame 12.

In closer detail, the front frame 12 has a top 13, a bottom 14, and a pair of opposite sides 15,16. The front frame 12 is constructed like typical frames having a pair of eyewires 17,18 and a bridge 19 connecting the eyewires 17,18 together. The eyewires 17,18 are designed for holding a lens. Each eyewire is associated with a side of the front frame 12. Each of the sides 15,16 of the front frame 12 has a loophole 30,31 outwardly extending therefrom. Preferably, the loopholes 30,31 are positioned towards the top 13 of the front frame 12.

The flexible elongate lace 20 has a pair of opposite ends 21,22. One of the ends 21 of the lace 20 is looped through one of the loopholes 30 of the front frame 12 while the other end 22 of the lace 20 is looped through the other loophole 31 of the front frame 12. Preferably, a pair of adjustment buckles 23,24 fasten the ends 21,22 to portions along the length of the lace 20. The adjustment buckles 23,24 permit adjustment of the relative length of the lace 20 between the side of the front frame 12 so that the lace 20 may be tightened around the head of a wearer of the eyeglasses 10.

Figure 5:
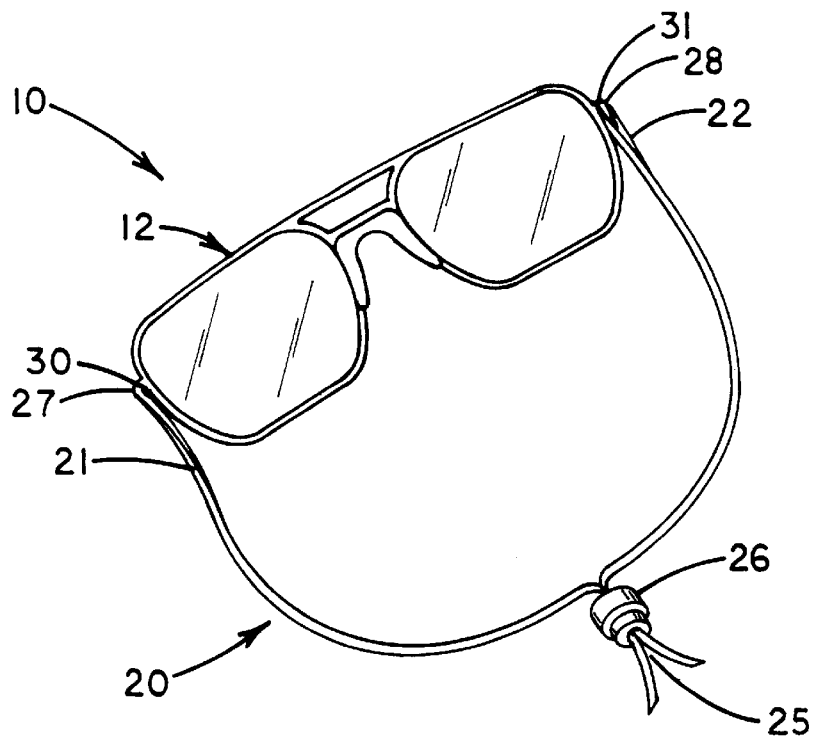
FIG. 5 is a schematic perspective view of an optional preferred embodiment of the present invention having a break in the lace.
Figure 6:
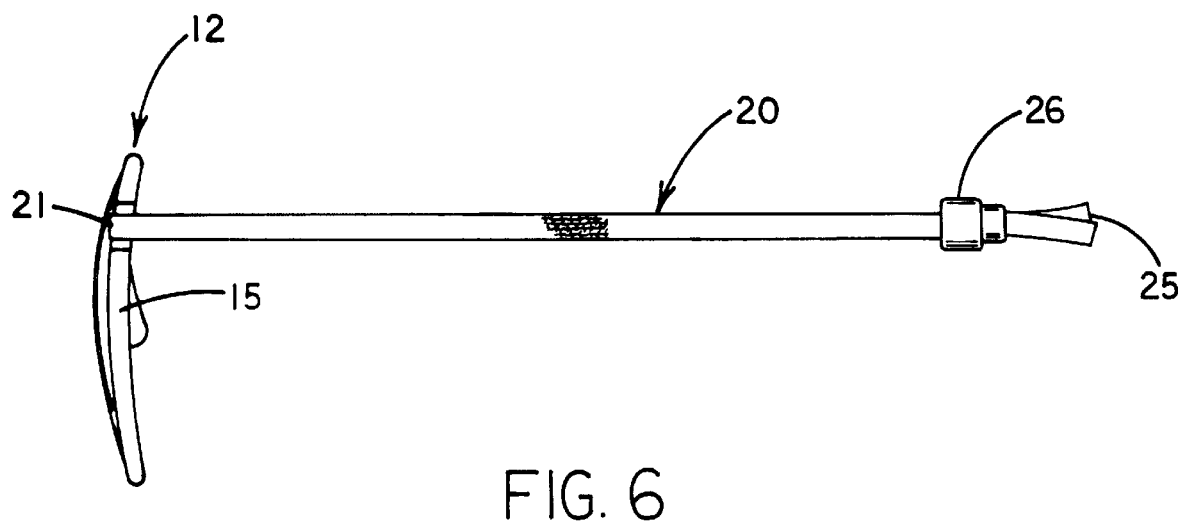
FIG. 6 is a schematic side view of an embodiment of the present invention having a break in the lace.

In an optional preferred embodiment, as illustrated in FIGS. 5 and 6, the lace 20 has a break 25 therethrough located between the ends 21,22 of the lace 20. The break 25 divides the lace 20 into a pair of elongate portions which are coupled together by a toggle clasp 26. Like the adjustment buckles, the toggle clasp 26 permits adjustment of the relative length of the lace 20 between the sides 15,16 of the front frame 12.

Figure 7:
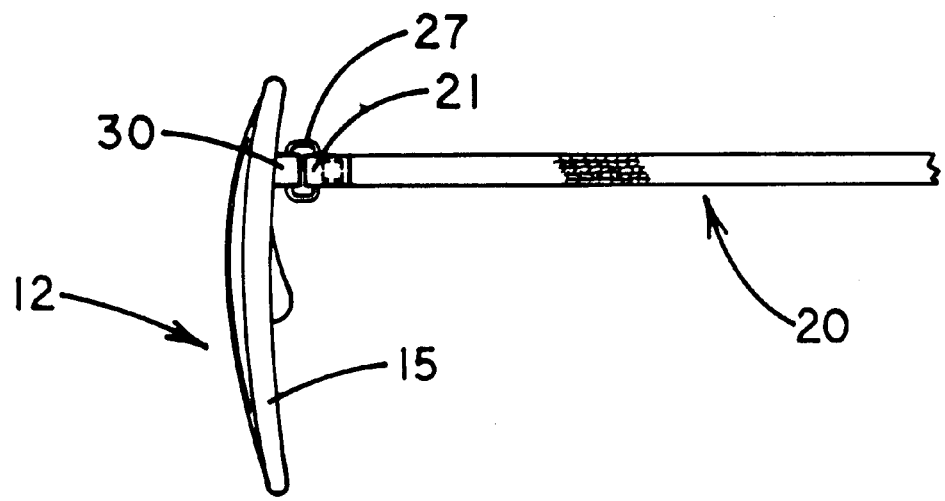
FIG. 7 is a schematic side view of another optional embodiment of the present invention with fastening rings.
Figure 8:
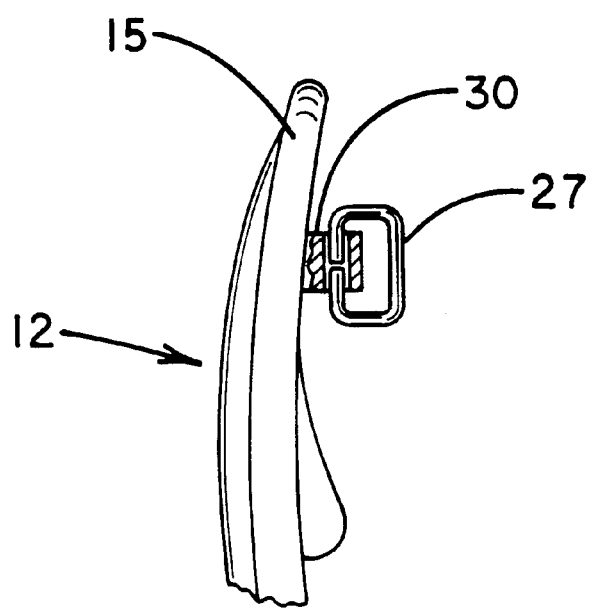
FIG. 8 is a schematic side view of the front frame of the embodiment of FIG. 7, with the lace removed.

In an additional optional embodiment, with reference to FIGS. 5, 7, and 8, a pair of fastening rings 27,28 are provided. Each fastening ring 27,28 fastens an associated end 21,22 of the lace 20 to the corresponding side 15, 16 of the front frame 12. The fastening rings 27,28 are looped through the loophole 30,31 extending from their associated side 15,16 of the front frame 12 such that the fastening rings 27,28 may swing from side to side in their loophole.

In use, a user places the front frame in place on their face and loops the lace around the back of their head. The relative length of the lace between the sides of the front frame is then adjusted either with the adjustment buckles or the toggle clasp so that the lace tightly holds the front frame to the head of the user on their face.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. Eyeglasses, comprising:

a front frame having a pair of opposite sides and a pair of lenses;

each of said sides of said front frame having a generally U-shaped portion fixedly extending therefrom such that a loophole is formed between the U-shaped portion and an outer edge of the side of the front frame, each of the U-shaped portions being substantially aligned with said plane extending across both of said first and second lenses;

a flexible elongate lace having a pair of opposite ends; and one of said ends of said lace being looped through one of said loopholes of said front frame, the other of said ends of said lace being looped through the other of said loopholes of said front frame.

2. The eyeglasses of claim 1, wherein said front frame has a top and a bottom, and wherein said loopholes are positioned towards said top of said front frame.

3. The eyeglasses of claim 1, further comprising a pair of adjustment buckles, wherein one of said adjustment buckles fastens one of said ends of said lace to a portion of said lace, and wherein the other of said adjustment buckles fastens the other of said ends of said lace to the other portion of said lace.

4. The eyeglasses of claim 1, wherein said lace has a break therethrough, said break being located between said ends of said lace, said break dividing said lace into a pair of elongate portions.

5. The eyeglasses of claim 4, further comprising a clasp coupling said elongate portions of said lace together.

6. The eyeglasses of claim 1, wherein each of said ends of said lace has a fastening ring, wherein each of said fastening rings being looped through the loophole extending from the corresponding side of said front frame such that said ends of said lace are fastened to said sides of said front frame.

7. Eyeglasses, comprising:

a front frame having a top, a bottom, a pair of opposite sides, first and second halves, a first lens positioned in said first half of said frame, a second lens positioned in said second half of said frame, said first and second lenses being generally aligned along a plane extending across said lenses;

each of said halves of said frame having a substantially straight top portion and a substantially straight bottom portion being aligned substantially perpendicular to the corresponding straight top portion;

each of said sides of said front frame having a generally U-shaped portion fixedly extending therefrom such that a rectangular loophole is formed between the U-shaped portion and an outer edge of the side of the front frame, each of the U-shaped portions being substantially aligned with said plane extending across both of said first and second lenses, said loopholes being positioned towards said top of said front frame;

a flexible elongate lace having a pair of opposite ends;

one of said ends of said lace being looped through one of said loopholes of said front frame, the other of said ends of said lace being looped through the other of said loopholes of said front frame;

a pair of adjustment buckles, one of said adjustment buckles fastening one of said ends of said lace to a portion of said lace, the other of said adjustment buckles fastening the other of said ends of said lace to the other portion of said lace;

said lace having a break therethrough, said break being located between said ends of said lace, said break dividing said lace into a pair of elongate portions;

a clasp coupling said elongate portions of said lace together.

* * * * *